(12) United States Patent
Badal-Badalian et al.

(10) Patent No.: US 12,488,342 B2
(45) Date of Patent: Dec. 2, 2025

(54) SYSTEM AND METHOD FOR SECURE WEB SERVICE ACCESS CONTROL

(71) Applicant: ROYAL BANK OF CANADA, Toronto (CA)

(72) Inventors: Arnold Badal-Badalian, Toronto (CA); Seung Bong Baek, Toronto (CA); Syed Ahmar Imam, Milton (CA)

(73) Assignee: ROYAL BANK OF CANADA, Toronto (CA)

( * ) Notice: Subject to any disclaimer, the term of this patent is extended or adjusted under 35 U.S.C. 154(b) by 29 days.

(21) Appl. No.: 17/585,154

(22) Filed: Jan. 26, 2022

(65) Prior Publication Data

US 2022/0237610 A1 Jul. 28, 2022

Related U.S. Application Data

(60) Provisional application No. 63/141,726, filed on Jan. 26, 2021.

(51) Int. Cl.
| | |
|---|---|
| *G06Q 20/40* | (2012.01) |
| *G06Q 20/32* | (2012.01) |
| *G06Q 20/38* | (2012.01) |

(52) U.S. Cl.
CPC ....... *G06Q 20/401* (2013.01); *G06Q 20/3221* (2013.01); *G06Q 20/3829* (2013.01); *G06Q 2220/00* (2013.01)

(58) Field of Classification Search
CPC ............ G06Q 20/401; G06Q 20/3221; G06Q 20/3829; G06Q 2220/00

USPC ........................................................... 705/71
See application file for complete search history.

(56) References Cited

U.S. PATENT DOCUMENTS

| | | | |
|---|---|---|---|
| 2013/0185210 A1* | 7/2013 | Dodson | G06Q 20/40 705/44 |
| 2016/0162875 A1* | 6/2016 | DeSoto | G06Q 20/202 705/21 |
| 2016/0300231 A1* | 10/2016 | Shavell | G06Q 20/425 |
| 2016/0307194 A1* | 10/2016 | Bhatnagar | H04L 63/0838 |
| 2016/0351080 A1* | 12/2016 | Bhatnagar | G09C 5/00 |
| 2016/0379209 A1* | 12/2016 | Beenau | H04L 63/061 713/156 |
| 2017/0070484 A1* | 3/2017 | Kruse | H04L 9/14 |
| 2017/0132594 A1* | 5/2017 | Morgan | G06Q 20/4012 |
| 2018/0130051 A1* | 5/2018 | Matthews | G06V 10/17 |
| 2018/0174137 A1* | 6/2018 | Subbarayan | G06Q 50/01 |
| 2019/0260732 A1* | 8/2019 | Narayan | H04L 63/0807 |
| 2020/0005106 A1* | 1/2020 | Singh | G06Q 20/3827 |
| 2020/0304486 A1* | 9/2020 | de Ganon | G06Q 20/38215 |
| 2021/0035086 A1* | 2/2021 | Khan | G06Q 20/204 |

(Continued)

*Primary Examiner* — Courtney P Jones
(74) *Attorney, Agent, or Firm* — Norton Rose Fulbright Canada LLP

(57) ABSTRACT

A computer system and method for populating electronic payment credentials is provided. The system comprises at least one processor and a memory storing instructions which when executed by the processor configure the processor to perform the method. The method comprises receiving a browser extension activation input, sending a payment details request message to a financial institution system, receiving payment details from the financial institution system following authentication at a mobile device, and populating a payment form on the browser using the payment details.

20 Claims, 11 Drawing Sheets

(56) References Cited

U.S. PATENT DOCUMENTS

2022/0058617 A1* 2/2022 Tibrewala .............. G06Q 20/02
2022/0247579 A1* 8/2022 Bester ................. H04L 63/0807

* cited by examiner

SYSTEM AND METHOD FOR SECURE WEB SERVICE ACCESS CONTROL

CROSS REFERENCE TO RELATED APPLICATIONS

This application is a non-provisional of, and claims all benefit, including priority to U.S. Application No. 63/141,726, dated Jan. 26, 2021, entitled SYSTEM AND METHOD FOR SECURE WEB SERVICE ACCESS CONTROL, incorporated herein in its entirety by reference.

FIELD

The present disclosure relates generally to electronic payments, and in particular to a system and method for secure web service access control.

INTRODUCTION

Electronic payments may be made for online purchases. Often, the online purchase experience involved a user filling out a payment form on a browser with payment details, such as credit card details. Such online activity can sometimes be not secure. Compromised devices and/or communications may allow unscrupulous individuals to observe and collect confidential financial details form the online forms.

SUMMARY

In some embodiments, there is provided a system and method for securely auto populating online forms used in electronic financial transactions. A browser extension may be activated to securely collect payment details from a financial institution system and then populate an invisible (to humans) online form with the payment details. Optionally, a visible online form on a browser may be populated with masked information.

The browser extension associated with a user on a first device may generate a key pair and send a request to the financial institution system that includes requested payment details and the generated private key. The financial institution may then send a communication to a second (e.g., mobile) device associated with the user. The user may then authorize the payment. The financial institution system may then securely send the financial information to the browser extension encrypted with the private key.

If a second device is not associated with the browser extension (associated with the user) in the financial institution system, then the financial institution system may send a QR code to the browser extension to be displayed to the user. The user may then use a second device (e.g., mobile device) to scan the QR code and thus associate, link or bind the browser extension with the second device. The financial institution system may also send a private key certificate (e.g., the browser extension private key encrypted using the financial institution's private key). The browser extension may then store and use this private key certificate in future communications with the financial institution system in order to identify the second device without needing to send a QR code.

In one embodiment, there is provided a system for securely populating electronic payment credentials on a first device. The system comprises at least one processor and a memory storing instructions which when executed by the processor configure the processor to receive a browser extension activation input for a browser extension to a browser on the first device, send a payment details request message from the browser extension to a financial institution system, receive at the browser extension the payment details from the financial institution system following authentication at a mobile device, and populate by the browser extension a payment form on the browser using the payment details. The payment details request message requests payment details for an electronic payment at the browser on the first device. The mobile device is associated with the browser extension at the financial institution system.

In another embodiment, there is provided a method of populating electronic payment credentials. The method comprises receiving a browser extension activation input for a browser extension to a browser on the first device, sending a payment details request message from the browser extension to a financial institution system, receiving at the browser extension the payment details from the financial institution system following authentication at a mobile device, and populating by the browser extension a payment form on the browser using the payment details. The payment details request message requests payment details for an electronic payment at the browser on the first device. The mobile device is associated with the browser extension at the financial institution system.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

Embodiments will be described, by way of example only, with reference to the attached figures, wherein in the figures.

DETAILED DESCRIPTION

Embodiments of methods, systems, and apparatus are described through reference to the drawings.

In some embodiments, a browser extension system for facilitating electronic payments between a browser on a first device and a wallet on a second (e.g., mobile) device is provided. The browser extension system allows for an automatic populating of payment credential details in an online payment form. Any authentication on the mobile device would indirectly provide a two factor authentication for the electronic purchase.

In some embodiments, there is provided a system and method for securely auto populating online forms used in electronic financial transactions. A browser extension may be activated to securely collect payment details from a financial institution system and then populate an invisible (to humans) online form with the payment details. Optionally, a visible online form on a browser may be populated with masked information.

The browser extension associated with a user on a first device may generate a key pair and send a request to the financial institution system that includes requested payment details and the generated private key. The financial institution may then send a communication to a second (e.g., mobile) device associated with the user. The user may then authorize the payment. The financial institution system may then securely send the financial information to the browser extension encrypted with the private key.

If a second device is not associated with the browser extension (associated with the user) in the financial institution system, then the financial institution system may send a QR code to the browser extension to be displayed to the user. The user may then use a second device (e.g., mobile device) to scan the QR code and thus associate, link or bind the browser extension with the second device. The financial institution system may also send a private key certificate (e.g., the browser extension private key encrypted using the financial institution's private key). The browser extension may then store and use this private key certificate in future communications with the financial institution system in order to identify the second device without needing to send a QR code.

Figure 1:
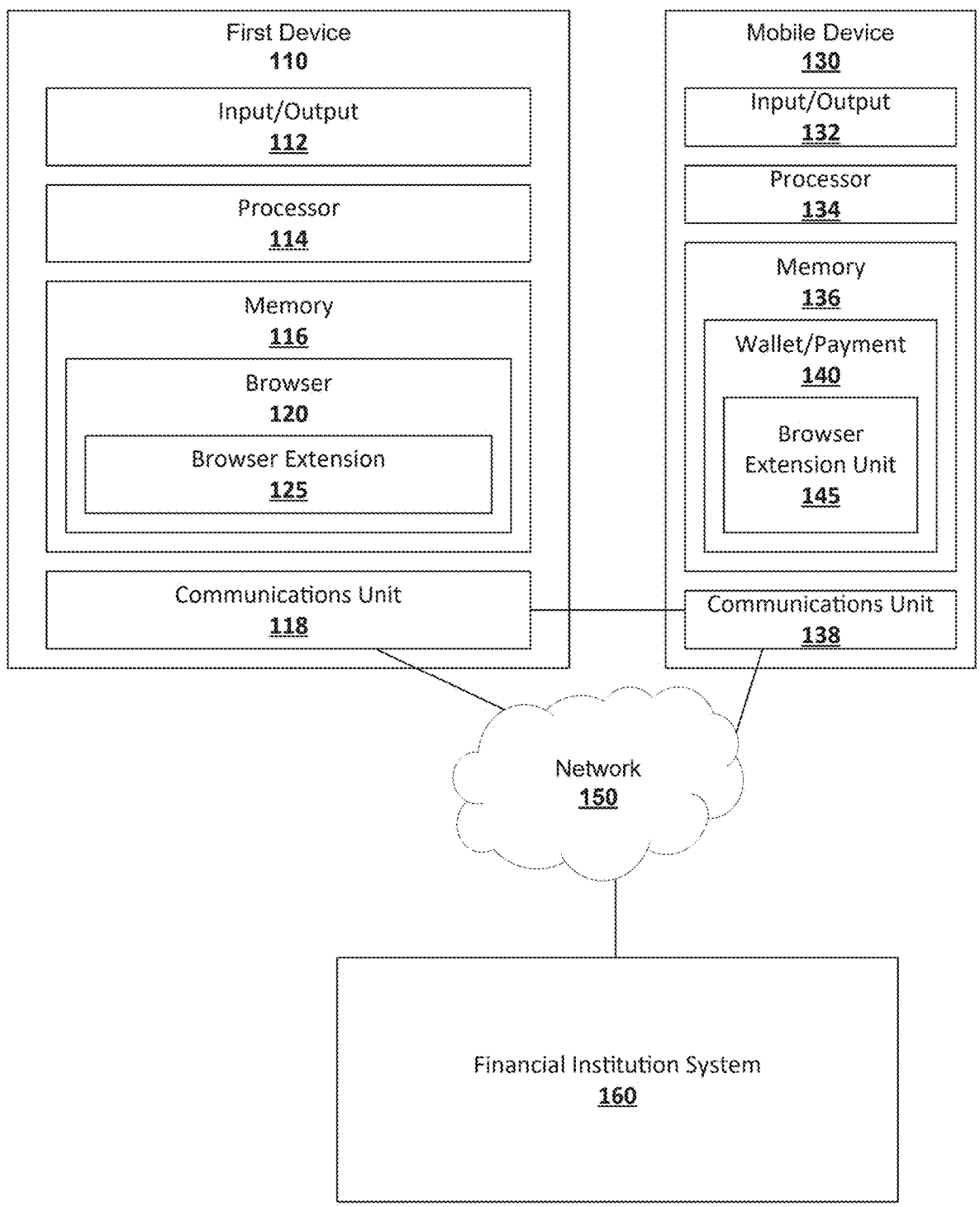
FIG. 1 illustrates an example of an electronic payment system, in accordance with some embodiments.

FIG. 1 illustrates an example of an electronic payment system 100, in accordance with some embodiments. The electronic payment system 100 comprises a first device 110, a mobile device 130, a network 150 and a financial institution system 160. The first device 110 may communication with the mobile device directly or via network 150. The financial institution system 160 may communication with either the first device 110 or mobile device 130 via the network 160. Other components may be added to the electronic payment system 100, including a merchant e-commerce system and a payment network.

The first device 110 may be a desktop, laptop, tablet, mobile phone or any other computing device capable of hosting a web browser. The first device 110 may comprise an input/output 112, at least one processor 114, a memory 116 and a communications unit 118.

The memory 116 comprises a browser 120 having a browser extension 125. Other components may be added to the first device.

The mobile device 130 may be a smart phone, tablet or any mobile device capable of storing a payment wallet application. The mobile device 110 may comprise an input/output 132, at least one processor 134, a memory 136 and a communications unit 138. The memory 136 comprises a wallet/payment application 140 having a browser extension unit 145. The mobile device 130 a payment wallet application 140 on a mobile device 130, and a browser extension unit 135 on the mobile device. Other components may be added to the mobile device.

Figure 2:
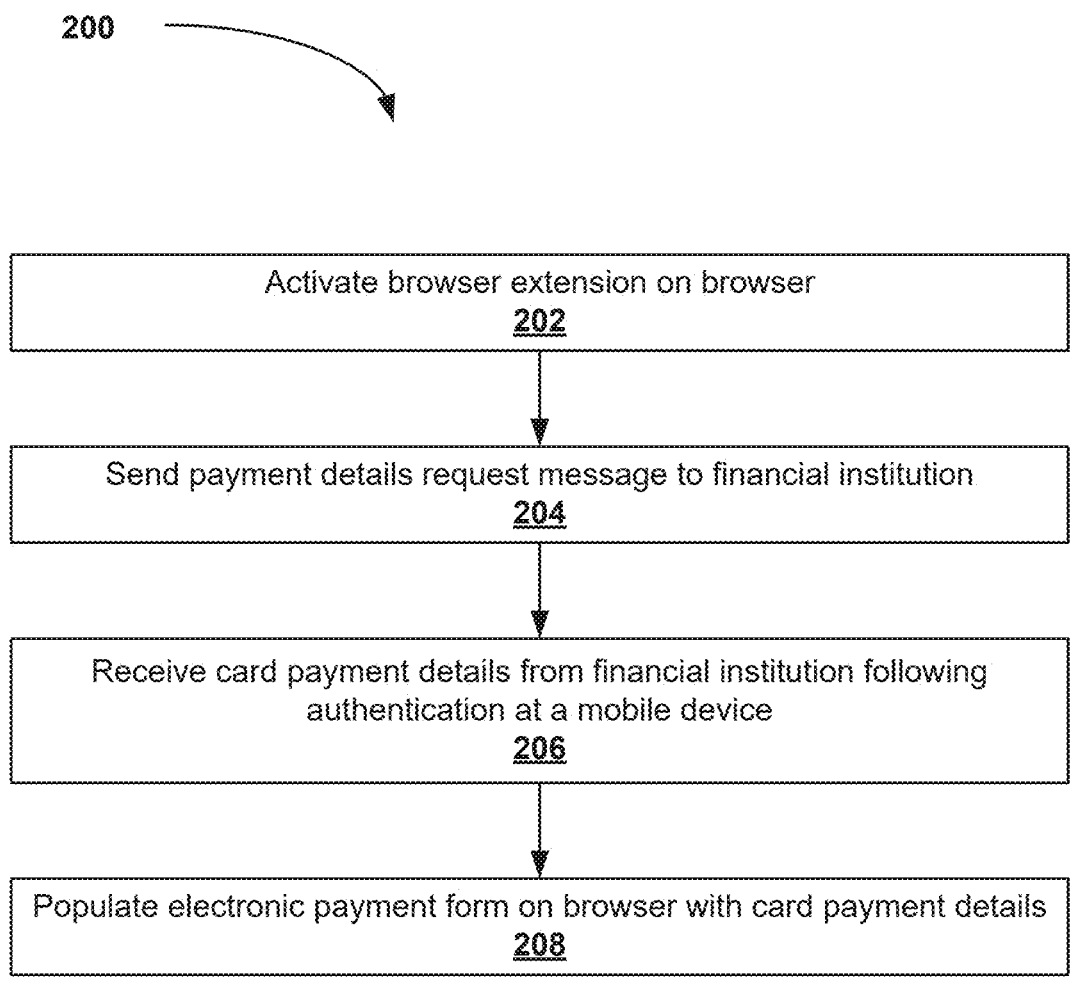
FIG. 2 illustrates, in a flowchart, an example of a method of populating electronic payment credentials, in accordance with some embodiments.

FIG. 2 illustrates, in a flowchart, an example of a method of populating electronic payment credentials 200, in accordance with some embodiments. The method 200 may be performed in a browser extension on a first device. When a user has selected an item for electronic purchase on a browser, an electronic payment form may be presented for payment. The form may include fields for card payment details. For example, a credit card payment form may include field for the user to populate a card number, expiry date and a card verification value (CVV). Other payment methods may request the same, different, fewer or additional payment details. Such payment details may be stored in a wallet or electronic payment application on a mobile device. The user may activate/initiate 202 a browser extension 125 on the browser 120. The browser may then send 204 a payment details request message to the financial institution 160. In some embodiments, the request message may be authenticated following a quick response (QR) code scan by the mobile device of a QR code displayed by the browser 120. In some embodiments, a wallet/payment application 140 may be registered and linked to the browser extension 125 such that the browser extension 120 may send the request directly to the financial institution 160 upon activation 202. Once the payment details are received 206 from the financial institution 160, the details may be automatically populated 208 in the browser for the user. Other steps may be added to the method 200.

In some embodiments, the payment information or details may include a 16 digit credit card number, an expiry date and a CVV or CVV2 number. Typically, CVV or CVV2 numbers may not be stored. However, a financial institution system may obtain a CVV2 number on demand (not stored). In some embodiments, a dynamic CVV2 number may change periodically, thereby adding a timing element to any financial transaction using the dynamic CVV2 number for added security. In some embodiments, the payment information may be a one-time use card or virtual card generated by the financial institution system for that electronic transaction.

Figure 3A:
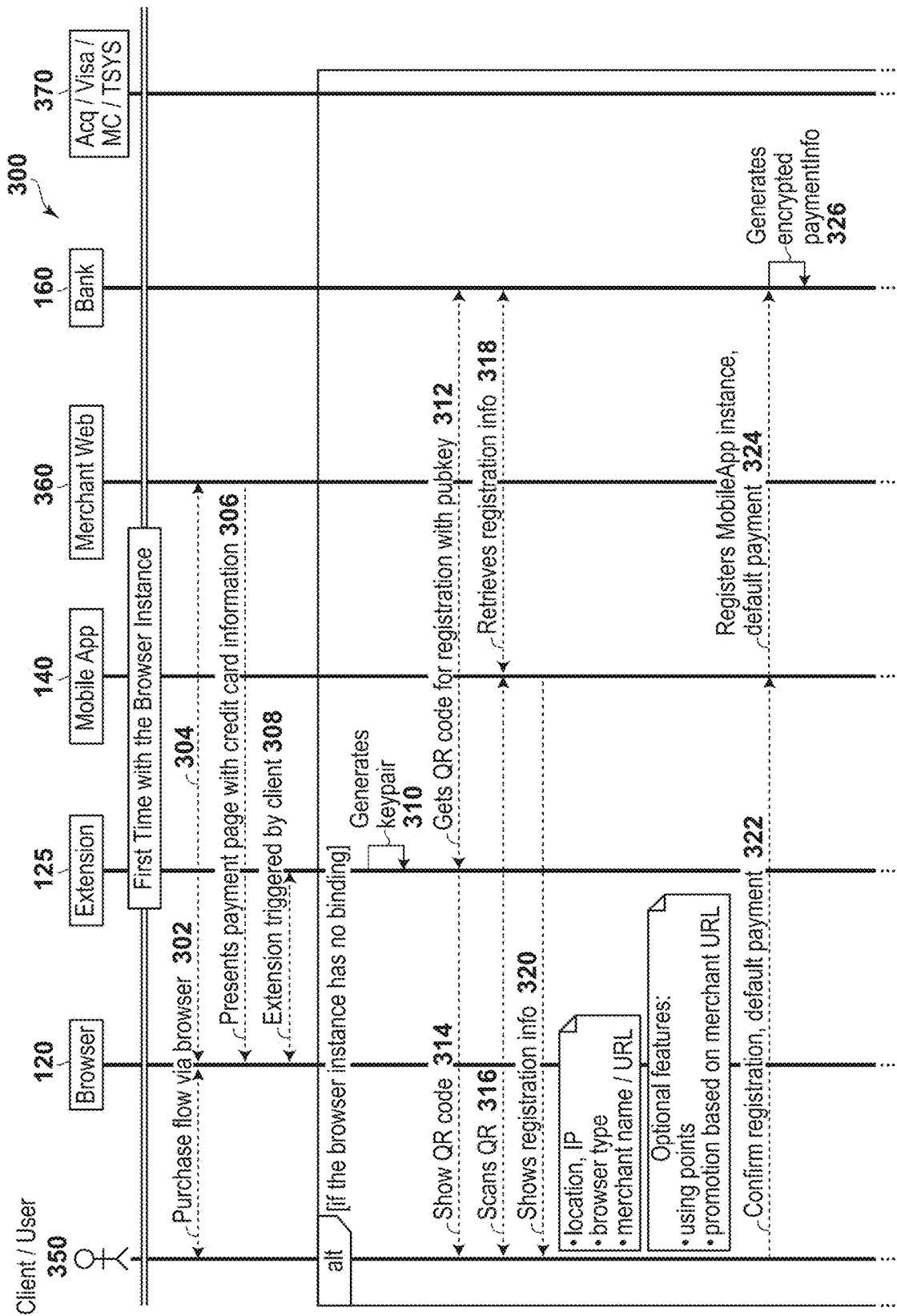
FIG. 3 illustrates, in a call-flow diagram, an example of a method of electronic payment, in accordance with some embodiments.
Figure 3B:
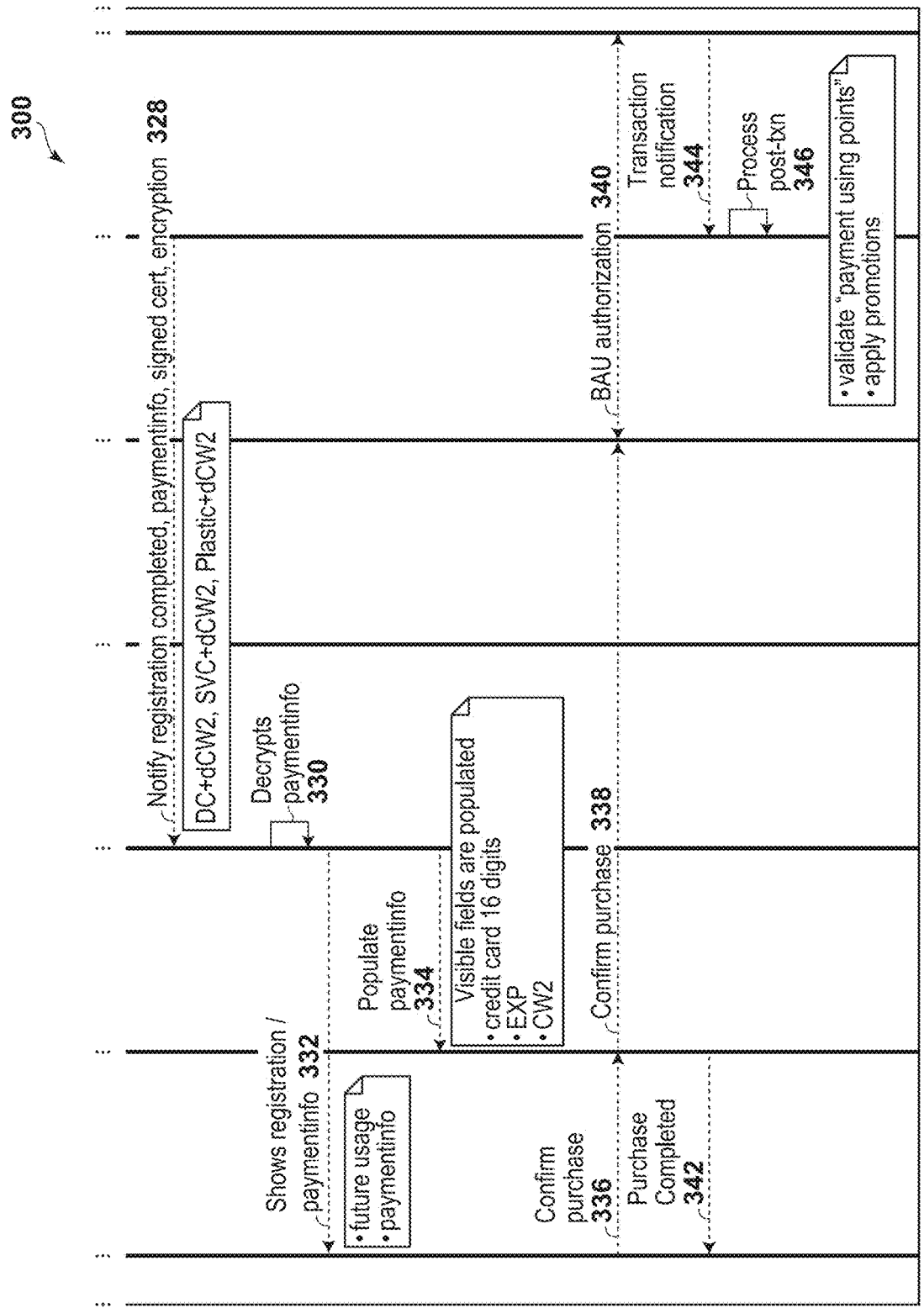

FIG. 3 illustrates, in a call-flow diagram, an example of a method of electronic payment 300, in accordance with some embodiments. The method 300 involves a browser extension with QR and push notification with no integration with a merchant system. The method 300 is performed in a first interaction of the browser instance. A client 350 may interact with a browser 120 for a purchase flow 302, 304 between the browser 120 and merchant web 360. The merchant web 360 may present a payment page with payment card (e.g., credit card) information fields to be filled in by the user 350. The user may trigger 308 the browser extension 125. It should be understood that while credit card payment details are described herein, other forms of payment may be used.

If the browser instance has no binding to a mobile wallet/payment application 140, then the browser extension 125 may generate 310 a keypair including a public key, and send the public key and payment information request to the financial institution system 160. The browser extension 125 may then receive 312 a QR code for registration with the public key. The QR code may be generated at the financial institution 160 based on the generated 310 keypair sent to the financial institution. The QR code is displayed 314 to the user 350. In some embodiments, the QR code may be displayed in a pop up window. The user may use a second device (e.g., mobile) to scan 316 the QR code. Registration information pertaining to the user 350 is retrieved 318 from a financial institution. For example, portions of the request sent by the browser extension 125 may be displayed on the mobile device application 140 for the user to authorize/accept. The registration information may be displayed 320 to the user 350 on a display of the mobile device 130. In some embodiments, the registration information may include location, internet protocol, browser type, merchant name, merchant universal resource locator (URL). For example, the mobile application may obtain the browser type from user-agent header information, location may be obtained by requesting user permission, internet protocol may be obtained using third party services, and merchant information (including purchase information and/or loyalty information) may be included if the merchant device is integrated in the systems and processes described herein. In some embodiments, the details may include points or rewards, and promotions based on the merchant URL. For example, a push notification to the mobile may be sent by a backend server. I.e., the backend server may perform additional services and provide options to clients, such as:

- redeeming points during payment;
- recommending a new card (e.g., a client may be offered a percentage (e.g., 20%) of extra points when they apply and use a particular credit card);
- recommending the use of certain cards based on a merchant URL (e.g., the client has two cards with one card recommended for purchases at a first vendor and the other card recommended for purchases at a second vendor based on points that may be obtained by using the respective cards at the respective vendors).

In some embodiments, steps 310 to 320 may be triggered by a merchant device or backend server. For example, a marketing banner message may be presented to a user that may include a link to initiate pre-registration/pre-binding of the browser extension to the mobile device.

The user 350 may confirm and/or approve the registration on the mobile device 130 and issue a default payment 322. The mobile application 140 instance and default payment is registered 324 with the financial institution 160. The financial institution 160 may then generated encrypted payment information 326 and notify 328 the browser extension 125 that the registration is completed, the payment information, and a signed certificate encryption (e.g., private key generated by the browser extension that is digitally signed using the private key of the financial institution). In some embodiments, the mobile device application 140 may display an option for the user 350 to link the wallet 140 to the browser extension 125 for future secure and faster processing. In some embodiments, details (e.g., key pairs) of the binding (e.g., registration or link) of the browser extension mobile application to the mobile device 140 instance (e.g., wallet) may be stored on a mobile device keystore or browser cache. Alternatively, the binding (e.g., key pairs) may be stored in a backend database with support of a hardware security module. For example, an identifier of the browser extension 125 and an identifier of the second device may be stored in a look-up table in the back end of the financial institution system. The browser extension 125 may then decrypt 330 and parse the payment information and optionally display 332 the payment information. The browser extension 125 may also populate 334 the payment information in the browser 120, including if the wallet 140 is now linked to the browser extension 125. In some embodiments, for a credit card payment form, the credit card number, expiry date and CVV may be auto-populated from the decrypted payment information. In some embodiments, if payment information for a payment type that is different from payment type represented by the online form on the browser 120, the browser extension 125 may refresh the browser 120 to display a different payment form. The user 350 may then confirm 336 the purchase which causes the browser 120 to send a confirm purchase message 338 to the merchant web 360. A bank addressable unit (BAU) authorization 340 may be given by the payment network 370. The browser 120 may then display 342 that the purchase was completed. The payment network sends a transaction notification message 344 to the financial institution 160 that then processes and posts the transaction 346. Other steps may be added to the method 300, such as validating the payment using points, or applying promotions. For example, depending on how clients are allowed to redeem points during a purchase, confirmation that the payment actually happened (and not returned/refunded) may occur. Promotions may be applied in the same manner (as needed depending on how clients redeem promotions) to confirm payment and apply the promotions (e.g., awarding extra points, extra loyalty points to merchants, cashback discount, extended warranty, etc.). In some embodiments, the payment information may be for a new payment instrument that could be managed via time limits, number of uses or other restrictions.

Figure 4A:
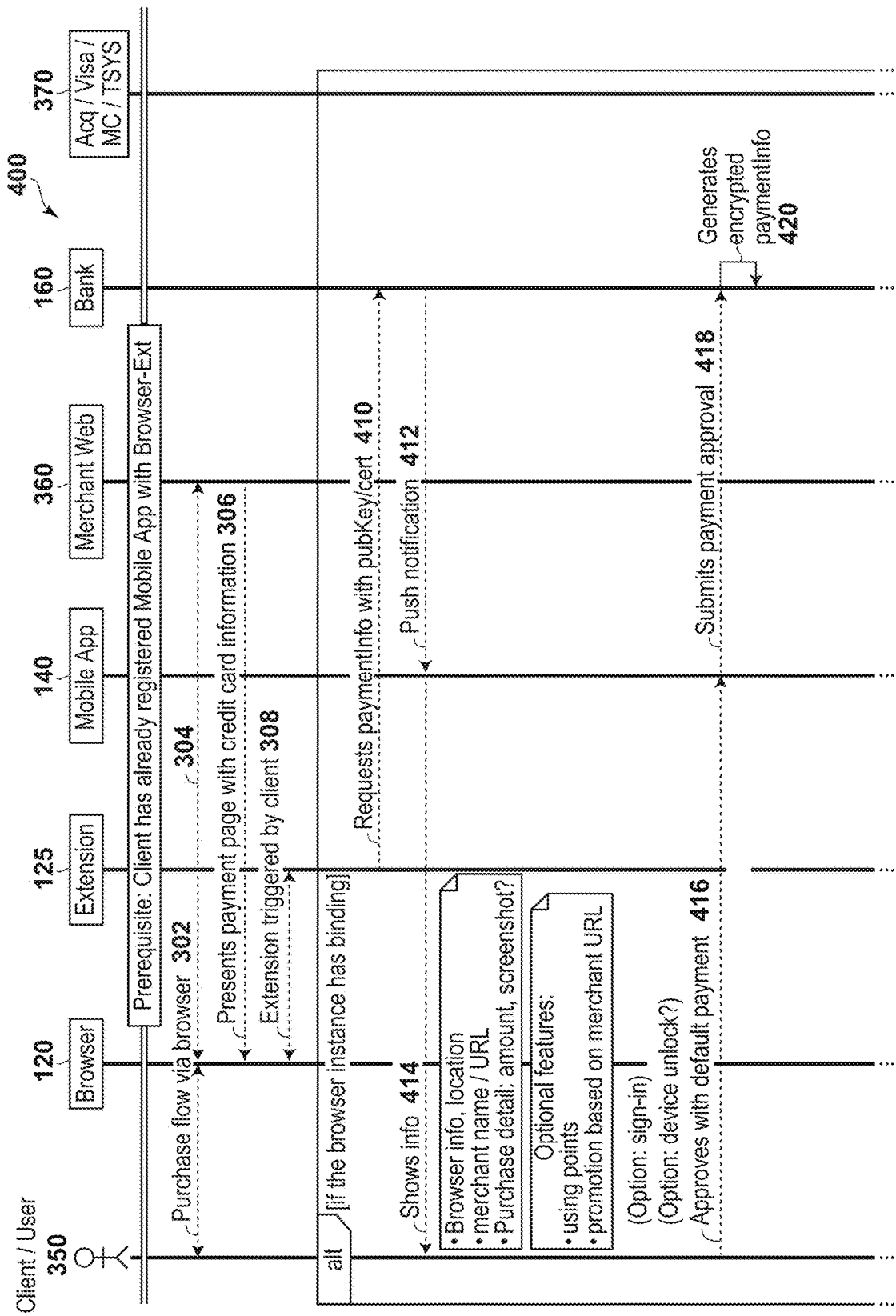
FIG. 4 illustrates, in a call-flow diagram, another example of a method of electronic payment, in accordance with some embodiments.
Figure 4B:
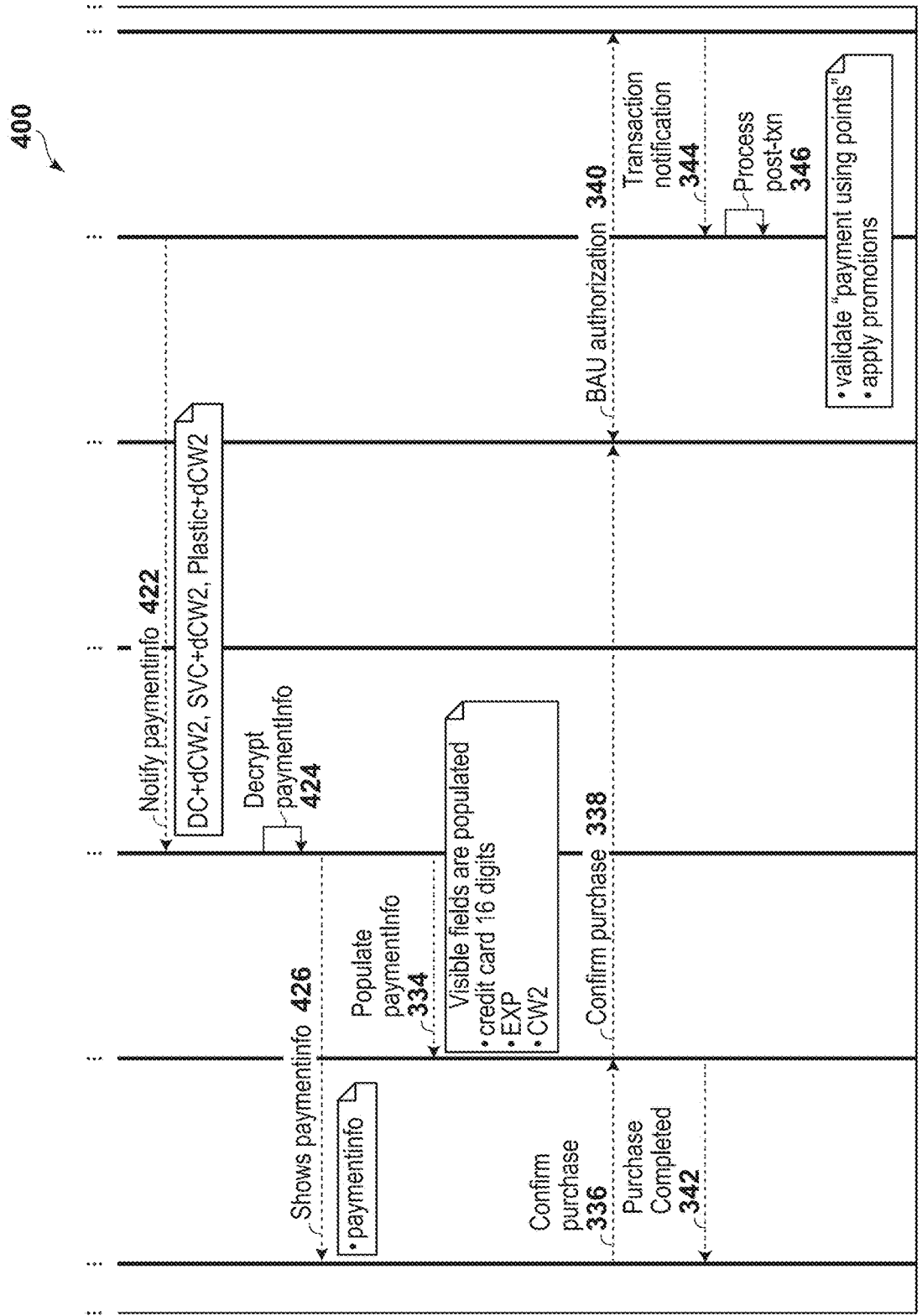

FIG. 4 illustrates, in a call-flow diagram, another example of a method of electronic payment 400, in accordance with some embodiments. The method 400 involves a browser extension with QR and push notification with no integration with a merchant system. The method 400 is performed when the client 350 has already registered its mobile application 140 with the browser extension 125. A client 350 may interact with a browser 120 for a purchase flow 302, 304 between the browser 120 and merchant web 360. The merchant web 360 may present a payment page with payment card (e.g., credit card) information fields to be filled in by the user 350. The user may trigger 308 the browser extension 125. In some embodiments, a browser instance may already be linked (i.e., has binding) to a mobile device wallet/payment application 140. Details (e.g., key pairs) of such linking may be stored either on the mobile device or on a backend database using a client identifier or client preferences. Storing the linking on a backend database allows for the reinstallation of the mobile application, or transfer/porting of the binding when a mobile device is exchanged, without loss of the binding details. In some embodiments, the browser instance may prove it has a binding stored at the financial institution system by sending a private key certificate (browser extension private key digitally signed or encrypted with the financial institution's private key). The financial institution may the fetch the device or devices bound to the browser extension stored in a memory. In some embodiments, there may be more than one alternative device associated (i.e., linked or binded) to the browser extension where a default or preferred device is selected. In some embodiments, the browser extension may send an identifier with its request to the financial institution system indicating which device to use for authentication. In some embodiments, the financial institution system may know that a user has recently upgraded an identified mobile device, and send the authentication to the updated mobile device rather than the one identified by the browser extension.

If the browser instance has binding to a mobile wallet/payment application 140, then the browser extension 125 may request the payment information with public key/certificate 410. The financial institution 160 may issue a push notification message 412 to the mobile application 140, which then may display 414 the payment information. In some embodiments, the payment information may include browser information, location, merchant name, merchant URL, and purchase details such as payment amount, screenshots, etc. In some embodiments, the details may include points or rewards, and promotions based on the merchant URL.

The user 350 may approve a purchase using default payment details 416 (including optionally, sign-in, mobile device unlock, or other authentication performed at the mobile device). The mobile application 140 may then submit the payment for approval 418 from the financial institution 160. The financial institution 160 may then generated encrypted payment information 420 and notify 422 the browser extension 125 of the payment information. The browser extension 125 may then decrypt 424 the payment information and display 426 the payment information. The browser extension 125 may also populate 334 the payment information in the browser 120. For example, for a credit card payment form, the credit card number, expiry date and CVV may be auto-populated from the decrypted payment information. The user 350 may then confirm the purchase which causes the browser 120 to send a confirm purchase message to the merchant web 360. A bank addressable unit (BAU) authorization 340 may be given by the payment network 370. The browser 120 may then display 342 that the purchase was completed. The payment network sends a transaction notification message 344 to the financial institution 160 that then processes and posts the transaction 346. Other steps may be added to the method 400, such as validating the payment using points, or applying promotions.

In some embodiments, an electronic token may be used for payment. Tokenized payment details may include a token number generated by the financial institution system and a (one-time use) cryptogram comprising a non-human friendly alphanumeric code. A tokenized payment may be associated with a time limit. The payment page presented by the merchant system may include both a credit card option or a tokenized payment option (or other electronic payment options). In some embodiments, the payment page with payment card information details may be presented to the browser extension in a manner that is not visible (i.e., not displayed) to the user.

Figure 5A:
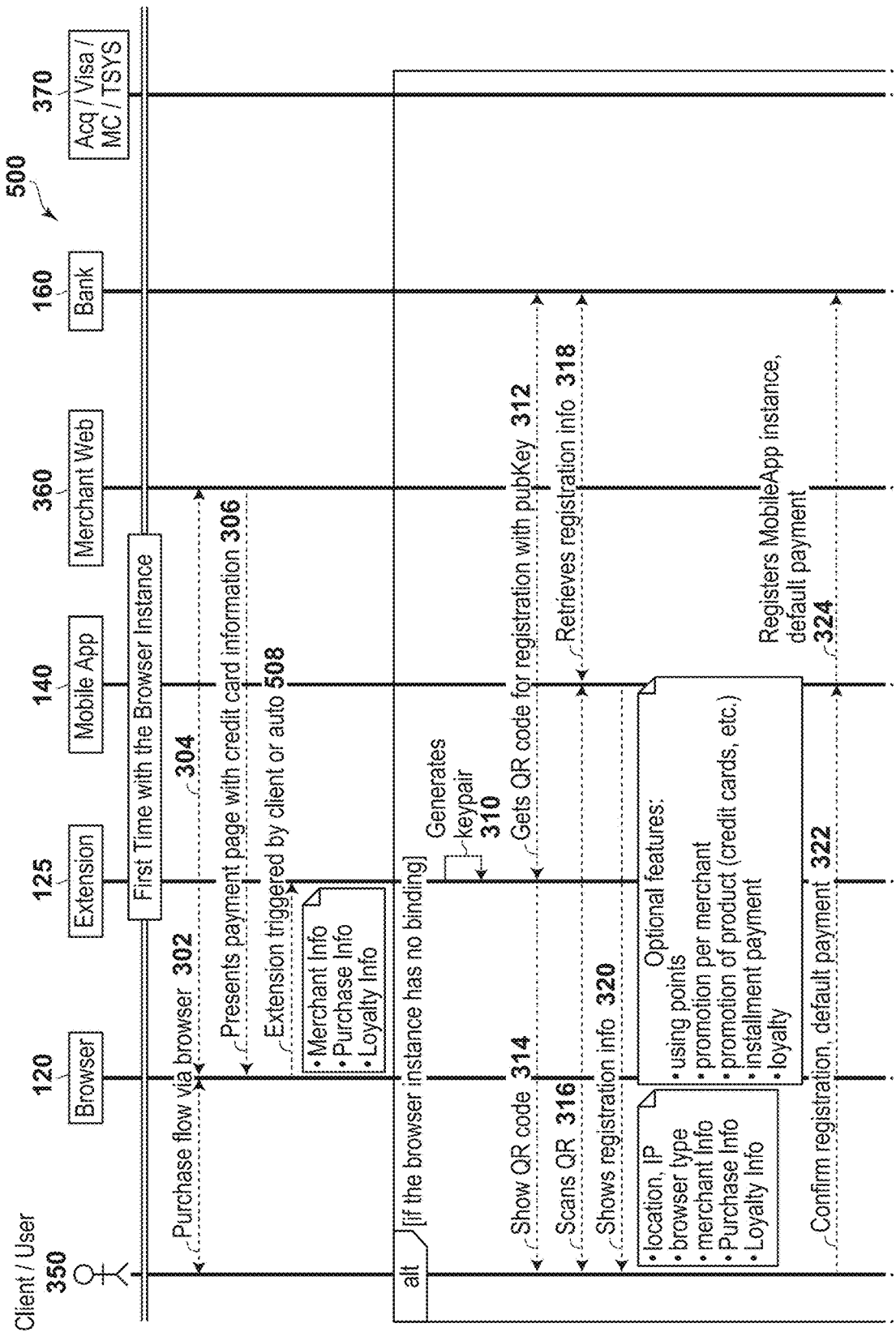
FIG. 5 illustrates, in a call-flow diagram, another example of a method of electronic payment, in accordance with some embodiments.
Figure 5B:
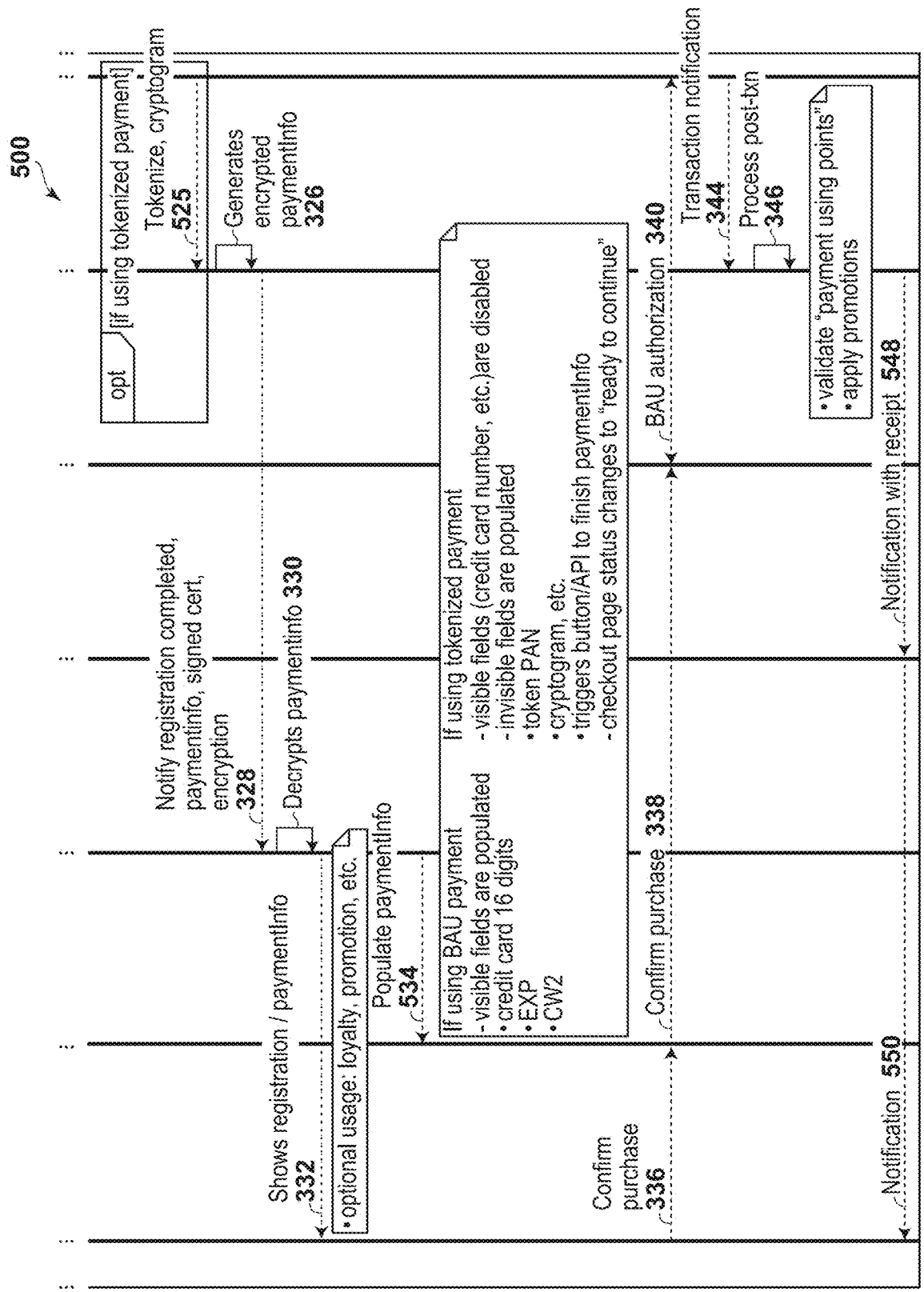

FIG. 5 illustrates, in a call-flow diagram, another example of a method of electronic payment 500, in accordance with some embodiments. The method 500 involves a browser extension with QR and push notification with integration with a merchant system. The method 300 is performed in a first interaction of the browser instance. A client 350 may interact with a browser 120 for a purchase flow 302, 304 between the browser 120 and merchant web 360. The merchant web 360 may present a payment page with payment card (e.g., credit card) information fields to be filled in by the user 350. The browser extension 125 may be triggered 508 by the user, or automatically. Merchant information, purchase information and/or loyalty information may be included. Thus, the browser extension 125 may include merchant information and payment type in its payment information request to the financial institution 160. In some embodiments, options for the payment type may be provided by the browser extension 125 to the browser 120 and/or the mobile device 130 to allow the user 350 to select the payment type. In some embodiments, the payment type may be selected based on the merchant (e.g., with merchants associated with a payment type or preferred payment type options).

If the browser instance has no binding to a mobile wallet/payment application 140, then the browser extension 125 may generate 310 a keypair, and receive 312 a QR code for registration with the public key. The QR code is displayed 314 to the user 350. The user may use its mobile to scan 316 the QR code. Registration information pertaining to the user 350 is retrieved 318 from a financial institution. The registration information is displayed 320 to the user 350. In some embodiments, the registration information may include location, internet protocol, browser type, merchant information, purchase information and loyalty information. In some embodiments, the details may include points or rewards, and promotions based on the merchant URL, promotion of financial institution product (e.g., credit cards, etc.), installment payments, and loyalty programs.

The user 350 may confirm the registration and issue a default payment 322. The mobile application 140 instance and default payment is registered 324. Optionally, if tokenized payment is being used, then the financial institution may generate 525 a token or cryptogram using the payment network 370 protocols. The financial institution 160 may then generated encrypted payment information 326 and notify 328 the browser extension 125 that the registration is completed, the payment information, and a signed certificate encryption. The browser extension 125 may then decrypt 330 the payment information and display 332 the payment information. Optionally, loyalty program information and promotions may be displayed. The browser extension 125 may also populate 334 the payment information in the browser 120. For example, if BAU payment is being used, then credit card payment form visible fields are populated with the credit card number, expiry date and CVV. If tokenized payments are being used, then visible fields (e.g., credit card number, etc.) are disabled and invisible fields are populated with, for example, a token primary account number (PAN) or a cryptogram, and an application programing interface (API) may be triggered to complete the payment information. A checkout page status may be changed to "ready to continue". The user 350 may then confirm the purchase 336 which causes the browser 120 to send a confirm purchase message 338 to the merchant web 360. A bank addressable unit (BAU) authorization 340 may be given by the payment network 370. The browser 120 may then display 342 that the purchase was completed. The payment network sends a transaction notification message 344 to the financial institution 160 that then processes and posts the transaction 346. The financial institution 160 may then send a notification with receipt 548 to the mobile application 140, which may then display a notification 550 to the user 350. Other steps may be added to the method 500, such as validating the payment using points, or applying promotions.

In some embodiments, device and/or client binding may occur without direct participation of the financial institution 160. For example, payment credential details may be obtained from a stored cryptogram or token in a secure memory in the device. The browser extension 125 may be configured to populate payment details based off of the stored cryptogram or token. In some embodiments, an identifier may be stored in the cryptogram or token that permits its usage by the browser extension 125. In other embodiments, a secure cryptogram or token may be used to store credit card validation (e.g., CVV2) or credit card code (e.g., CVC) related details to be populated by the browser extension. In some embodiments, a separate window or dialog box may be presented to the user seeking consent to access the secure cryptogram or token prior to the details being populated by the browser extension. In some embodiments, a user profile may be used to authenticate and/or validate a device for device binding.

Figure 6A:
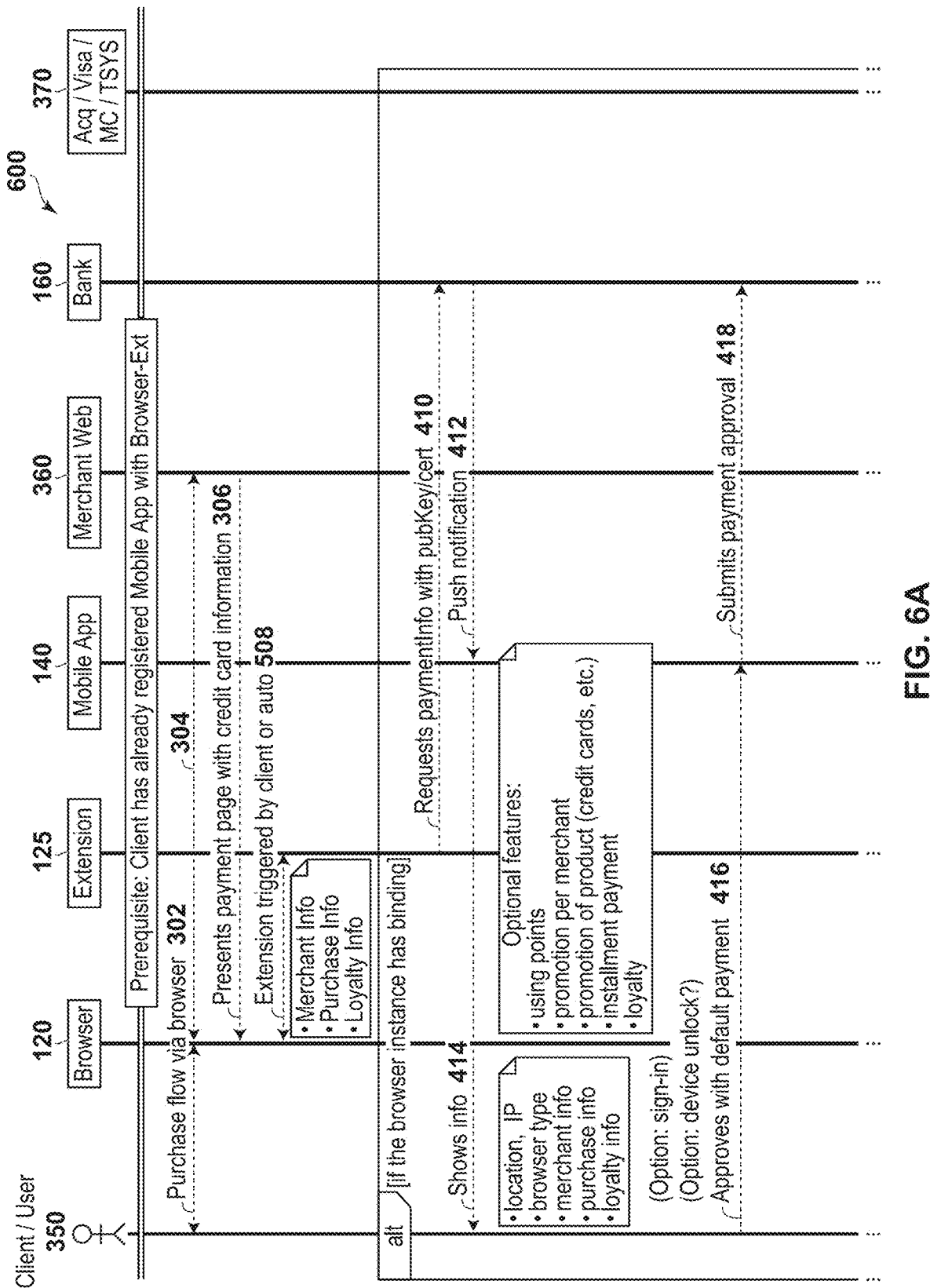
FIG. 6 illustrates, in a call-flow diagram, another example of a method of electronic payment, in accordance with some embodiments.
Figure 6B:
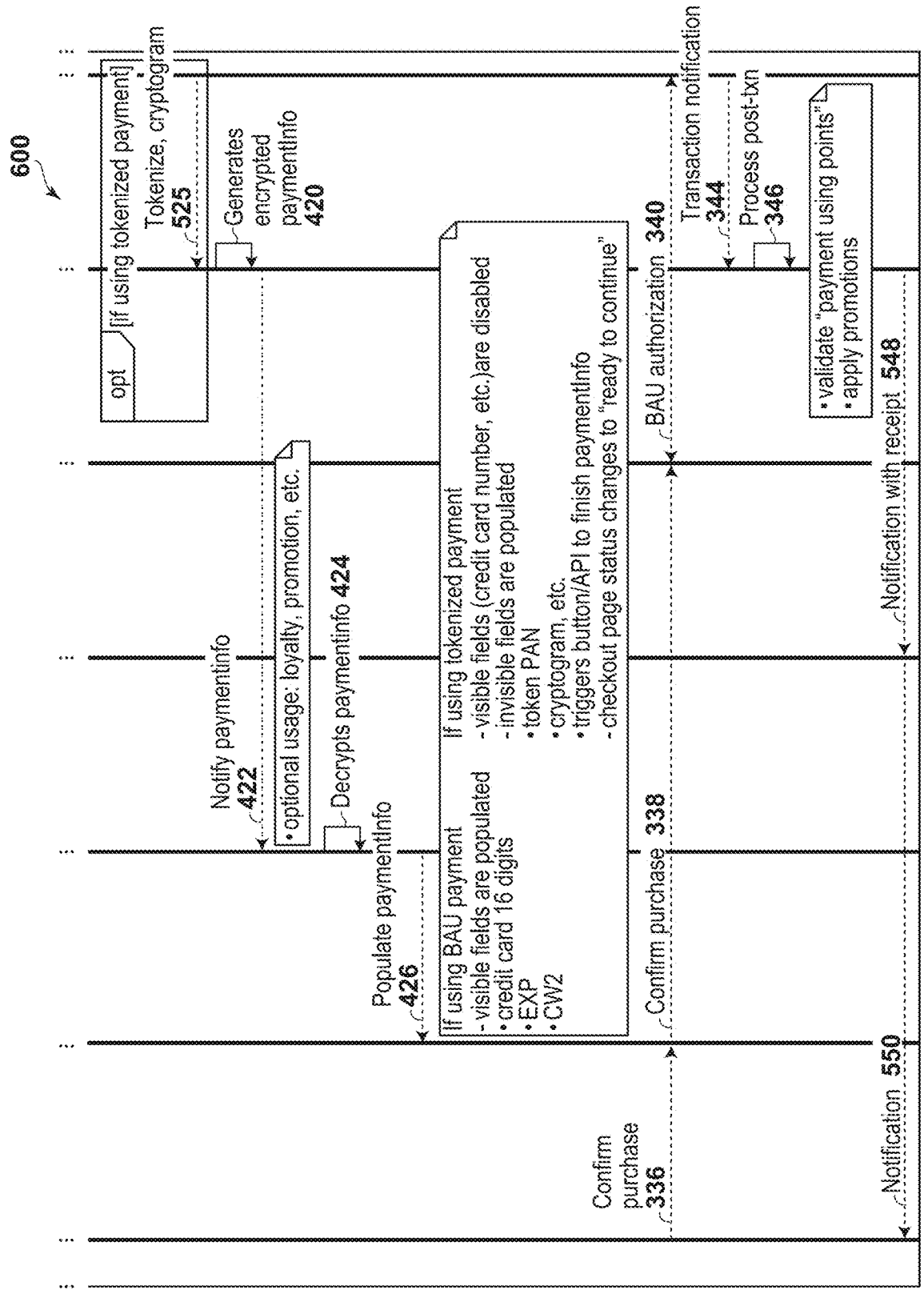

FIG. 6 illustrates, in a call-flow diagram, another example of a method of electronic payment 600, in accordance with some embodiments. The method 600 involves a browser extension with QR and push notification with integration with a merchant system. The method 600 is performed when the client has already registered its mobile application 140 with the browser extension 125. A client 350 may interact with a browser 120 for a purchase flow 302, 304 between the browser 120 and merchant web 360. The merchant web 360 may present a payment page with payment card (e.g., credit card) information fields to be filled in by the user 350. The browser extension 125 may be triggered 508 by the user, or automatically. Merchant information, purchase information and/or loyalty information may be included.

If the browser instance has binding to a mobile wallet/ payment application 140, then the browser extension 125 may request the payment information with public key/ certificate 410. The financial institution 160 may issue a push notification message 412 to the mobile application 140, which then may display 414 the payment information. In some embodiments, the registration information may include location, internet protocol, browser type, merchant information, purchase information and loyalty information. In some embodiments, the details may include points or rewards, and promotions based on the merchant URL, promotion of financial institution product (e.g., credit cards, etc.), installment payments, and loyalty program.

The user 350 may approve a purchase using default payment details 416 (including optionally, sign-in, mobile device unlock, or other authentication performed at the mobile device). The mobile application 140 may then submit the payment for approval 418 from the financial institution 160. Optionally, if tokenized payment is being used, then the financial institution may generate 525 a token or cryptogram using the payment network 370 protocols. The financial institution 160 may then generated encrypted payment information 420 and notify 422 the browser extension 125 of the payment information. In some embodiments, this includes displaying loyalty program information and promotions. The browser extension 125 may then decrypt 424 the payment information and display 426 the payment information. The browser extension 125 may also populate 334 the payment information in the browser 120. For example, if BAU payment is being used, then credit card payment form visible fields are populated with the credit card number, expiry date and CVV. If tokenized payments are being used, then visible fields (e.g., credit card number, etc.) are disabled and invisible fields are populated with, for example, a token primary account number (PAN) or a cryptogram, and an application programing interface (API) may be triggered to complete the payment information. A checkout page status may be changed to "ready to continue". The user 350 may then confirm the purchase 336 which causes the browser 120 to send a confirm purchase message 338 to the merchant web 360. A bank addressable unit (BAU) authorization 340 may be given by the payment network 370. The browser 120 may then display 342 that the purchase was completed. The payment network sends a transaction notification message 344 to the financial institution 160 that then processes and posts the transaction 346. The financial institution 160 may then send a notification with receipt 548 to the mobile application 140, which may then display a notification 550 to the user 350. Other steps may be added to the method 400, such as validating the payment using points, or applying promotions.

The tokenized payment handover may involve filling invisible fields on the web browser, or an API integration for tokenized ecommerce payments that involve cryptogram not meant for manual entry.

In some embodiments, the systems and methods described herein provide a technical approach using browser-extension and push-notification, security of bank mobile applications with push notification, and potential for additional services by financial institutions and merchants.

Figure 7:
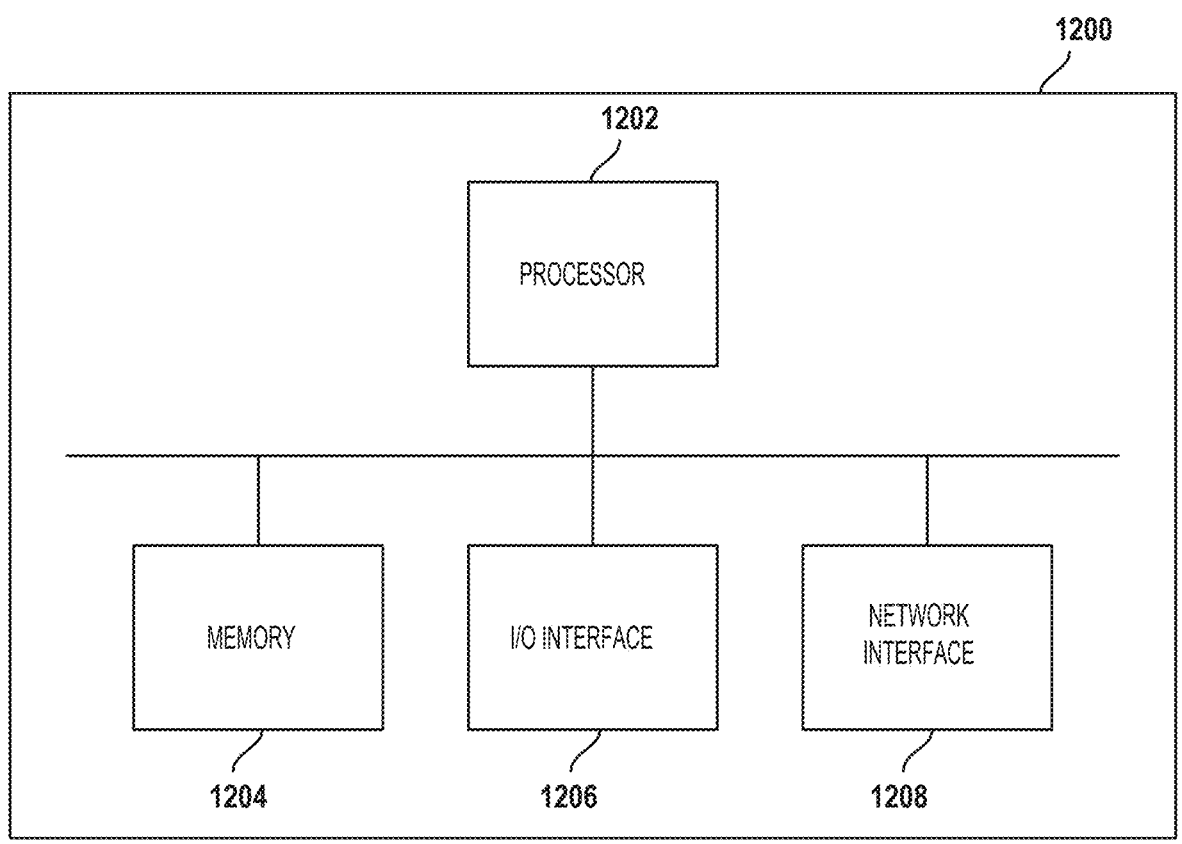
FIG. 7 is a schematic diagram of a computing device such as a server.

FIG. 7 is a schematic diagram of a computing device 1200 such as a server. As depicted, the computing device includes at least one processor 1202, memory 1204, at least one I/O interface 1206, and at least one network interface 1208.

Processor 1202 may be an Intel or AMD x86 or x64, PowerPC, ARM processor, or the like. Memory 1204 may include a suitable combination of computer memory that is located either internally or externally such as, for example, random-access memory (RAM), read-only memory (ROM), compact disc read-only memory (CDROM).

Each I/O interface 1206 enables computing device 1200 to interconnect with one or more input devices, such as a keyboard, mouse, camera, touch screen and a microphone, or with one or more output devices such as a display screen and a speaker.

Each network interface 1208 enables computing device 1200 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others.

The discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

What is claimed is:

1. A system for securely populating electronic payment credentials on a first device based on a secure binding between a browser extension and the first device, the system comprising:
at least one processor; and
a memory comprising instructions which, when executed by the processor, configure the processor to:
receive a browser extension activation input for the browser extension installed on a browser on the first device;
generate, at the browser extension, a keypair comprising a public key;
send the public key and a payment request message from the browser extension to a financial institution system, the payment request message requesting payment information for an electronic payment at the browser on the first device;
receive, at the browser extension, a device registration request from the financial institution, the device registration request generated based on the keypair;
cause to display the device registration request to a user for registration of a mobile device with the browser extension;
receive, at the browser extension, encrypted payment information and a signed private key certificate encrypted using a private key from the financial institution system following user registration of the mobile device based on the device registration request, the mobile device being linked to the browser extension through the user registration, wherein the linking of the mobile device and the browser extension is associated with the signed private key certificate from the financial institution system and establishing the secure binding between the browser extension and the first device;
decrypt the encrypted payment information to obtain the payment information; and
populate, by the browser extension, a payment form on the browser using the payment information, the payment form including at least one hidden field that is not visible through a user interface of the browser on the first device, the at least one hidden field including at least a token primary account number (PAN) or a cryptogram based at least in part on the signed private key certificate from the financial institution system, the at least one hidden field programmatically populated exclusively by the browser extension based at least on the signed private key certificate of the secure binding such that underlying secure information stored in the secure binding remains isolated from both the user and a recipient of the payment form.

2. The system as claimed in claim 1, wherein the at least one processor is configured to:
receive a payment page on the browser with payment card information from a merchant system;
send, by the browser, the browser extension activation input to the browser extension, the browser extension activation input including a payment form having fields to be populated with the payment information;
receive, at the browser, the populated payment form from the browser extension; and
send, by the browser, a confirm purchase request to the merchant system.

3. The system as claimed in claim 1, wherein the at least one processor is configured to:
receive payment page with payment card information from a merchant system;
send the browser extension the activation input;
receive the populated payment form from the browser extension;
send a confirm purchase request to the merchant system; and
display a purchase complete message on a browser display.

4. The system as claimed in claim 1, wherein the payment information is encrypted at the financial institution system, and the at least one processor is configured to decrypt the payment information.

5. The system as claimed in claim 1, wherein the at least one processor is configured to:
obtain, by the browser extension, a QR code from the financial institution system using the public key;
display, by the browser extension, the QR code on a browser display; and
receive, by the browser extension, a registration complete notification from the financial institution system, the registration complete notification message including the payment information encrypted using the public key.

6. The system as claimed in claim 5, wherein the mobile device comprises at least one processor configured to:
scan the QR code;
receive a confirmation input; and
send the confirmation to the financial institution system.

7. The system as claimed in claim 6, wherein the at least one processor of the mobile device is configured to at least one of:
store registration details linking the browser extension to the mobile device in a secure memory; or
send instructions to the financial institution system to store the registration details linking the browser extension to the mobile device.

8. The system as claimed in claim 1, wherein the payment information comprises a tokenized cryptogram.

9. The system as claimed in claim 1, wherein the financial institution system comprises at least one processor configured to:
receive the payment request message;
send a QR code representing the payment information to the browser extension;
receive the confirmation from the mobile device; and
send the encrypted payment information to the browser extension.

10. The system as claimed in claim 1, wherein the at least one processor is configured to:
confirm payment received; and
apply promotion points, post transaction, to at least one of a merchant account or a loyalty account.

11. A computer-implemented method of securely populating electronic payment credentials at a first device based on a secure binding between a browser extension and the first device, the method comprising:
receiving a browser extension activation input for the browser extension to a browser installed on the first device;
generating, at the browser extension, a keypair comprising a public key;
sending the public key and a payment request message from the browser extension to a financial institution system, the payment request message requesting payment information for an electronic payment at the browser on the first device;
receiving, at the browser extension, a device registration request from the financial institution, the device registration request generated based on the keypair;
causing to display the device registration request to a user for registration of a mobile device with the browser extension;
receiving, at the browser extension, encrypted payment information and a signed private key certificate encrypted using a private key from the financial institution system following user registration of the mobile device based on the device registration request, the mobile device being linked to the browser extension through the user registration, wherein the linking of the mobile device and the browser extension is associated with the signed private key certificate from the financial institution system and establishing the secure binding between the browser extension and the first device;
decrypting the encrypted payment information to obtain the payment information; and
populating, by the browser extension, a payment form on the browser using the payment information, the payment form including at least one hidden field that is not visible through a user interface of the browser on the first device, the at least one hidden field including at least a token primary account number (PAN) or a cryptogram based at least in part on the signed private key certificate from the financial institution system, the at least one hidden field programmatically populated exclusively by the browser extension based at least on the signed private key certificate of the secure binding such that underlying secure information stored in the secure binding remains isolated from both the user and a recipient of the payment form.

12. The method as claimed in claim 11, comprising:
receiving a payment page on the browser with payment card information from a merchant system;
sending, by the browser, the browser extension activation input to the browser extension, the browser extension activation input including a payment form having fields to be populated with the payment information;
receiving, at the browser, the populated payment form from the browser extension; and
sending, by the browser, a confirm purchase request to the merchant system.

13. The method as claimed in claim 11, comprising:
receiving payment page with payment card information from a merchant system;
sending the browser extension the activation input;
receiving the populated payment form from the browser extension;
sending a confirm purchase request to the merchant system; and
displaying a purchase complete message on a browser display.

14. The method as claimed in claim 11, wherein the payment information is encrypted at the financial institution system, and the method comprises decrypting the payment information.

15. The method as claimed in claim 11, comprising:
obtaining, by the browser extension, a QR code from the financial institution system using the public key;
displaying, by the browser extension, the QR code on a browser display; and
receiving, by the browser extension, a registration complete notification from the financial institution system, the registration complete notification message including the payment information encrypted using the public key.

16. The method as claimed in claim 15, comprising a mobile device:
scanning the QR code;
receiving a confirmation input; and
sending the confirmation to the financial institution system.

17. The method as claimed in claim 16, comprising the mobile device performing at least one of:
storing registration details linking the browser extension to the mobile device in a secure memory; or
sending instructions to the financial institution system to store the registration details linking the browser extension to the mobile device.

18. The method as claimed in claim 11, wherein the payment information comprises a tokenized cryptogram.

19. The method as claimed in claim 11, wherein the financial institution system comprises at least one processor configured to perform:
receiving the payment request message;
sending a QR code representing the payment information to the browser extension;
receiving the confirmation from the mobile device; and
sending the encrypted payment information to the browser extension.

20. The method as claimed in claim 11, further comprising:
 confirming payment received; and
 applying promotion points, post transaction, to at least one of a merchant account or a loyalty account.

\* \* \* \* \*